(12) United States Patent
Mandel-Senft et al.

(10) Patent No.: US 11,605,954 B2
(45) Date of Patent: Mar. 14, 2023

(54) ASYMMETRICAL POWER OUTPUT DIRECT CURRENT FAST CHARGER

(71) Applicant: GM Cruise Holdings LLC, San Francisco, CA (US)

(72) Inventors: Adam Mandel-Senft, San Francisco, CA (US); Sue-Ling Huynh, San Francisco, CA (US); John Deniston, San Francisco, CA (US); Danny Curzon, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 846 days.

(21) Appl. No.: 16/456,451

(22) Filed: Jun. 28, 2019

(65) Prior Publication Data

US 2020/0412147 A1    Dec. 31, 2020

(51) Int. Cl.
*H02J 7/00* (2006.01)
*H02J 7/02* (2016.01)
*H02J 7/04* (2006.01)
*H02J 3/46* (2006.01)

(52) U.S. Cl.
CPC .............. *H02J 7/00* (2013.01); *H02J 3/46* (2013.01); *H02J 7/00034* (2020.01); *H02J 7/0042* (2013.01); *H02J 7/02* (2013.01); *H02J 7/022* (2013.01); *H02J 7/027* (2013.01); *H02J 7/04* (2013.01); *H02J 2207/20* (2020.01); *H02J 2310/48* (2020.01)

(58) Field of Classification Search
CPC ...... H02J 7/00; H02J 7/02; H02J 7/022; H02J 7/027; H02J 7/04; H02J 7/00034; H02J 7/0042; H02J 3/46; H02J 2207/20; H02J 2310/48
USPC ............................................. 320/109; 701/22
See application file for complete search history.

(56) References Cited

U.S. PATENT DOCUMENTS

2017/0274792 A1*  9/2017  Vaughan ................. B60L 53/68
2018/0001781 A1*  1/2018  Quattrini, Jr. ........... B60L 53/11

* cited by examiner

*Primary Examiner* — Zixuan Zhou
(74) *Attorney, Agent, or Firm* — Polsinelli PC (57) ABSTRACT

An example direct current fast charger (DCFC) for providing asymmetrical charging power to electric vehicles can include a first power module having a rectifier and control electronics, and a second power module having a rectifier and control electronics. The first power module can be configured to receive a request to charge a battery of an electric vehicle (EV) at a specified charge rate; determine that the specified charge rate exceeds a maximum charge rate of the first power module; request additional power from the second power module; when the second power module has available power to donate, receive donated power from the second power module; and charge the battery of the EV at an increased charge rate that exceeds the maximum charge rate of the first power module, the increased charge rate including a maximum power output of the first power module increased by the donated power.

18 Claims, 8 Drawing Sheets

ASYMMETRICAL POWER OUTPUT DIRECT CURRENT FAST CHARGER

TECHNICAL FIELD

The present disclosure generally relates to direct current fast chargers for electric vehicles.

BACKGROUND

Electric vehicles (EVs), which run on electricity, have experienced a significant increase in popularity and adoption rates, largely due to performance improvements, lower operating costs, reduced green-house gas emissions, reductions in vehicle costs, and improvements in battery technology. To run on electricity, EVs have a battery and an electric motor instead of a fuel tank and an internal combustion engine. EVs typically charge their batteries from conventional power outlets or dedicated charging stations. Charging stations can deliver energy to the EV, and different charging stations can offer different charging power levels. For example, level 1 chargers can deliver around 1.9 kW of power, Level 2 chargers can deliver up to 20 kW and current level 3 chargers, also referred to as Direct Current Fast Chargers (DCFC), can supply high currents of up to 400 A at voltages up to 1000V, delivering over 350 kW of power.

DCFC chargers can reduce the charging time as compared to level 1 and level 2 chargers. However, DCFC chargers can be very expensive and difficult to install. Moreover, DCFC chargers today are inflexible, resulting in a limited ability to accommodate a wide range of present and future battery charging power levels and requirements. As battery technology continues to evolve, the limited flexibility of today's DCFC chargers can render such DCFC chargers obsolete or inadequate, potentially prompting a need to replace deployed DCFC chargers with newer, more powerful DCFC chargers. This can create significant challenges and costs for DCFC charger owners and users.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements in electric vehicle (EV) charger technologies and capabilities. In some examples, a Direct Current Fast Charger (DCFC) is provided that can provide asymmetric power to multiple EVs. The DCFC can have multiple power sections or modules that can simultaneously charge multiple EVs and deliver asymmetric power levels to the different EVs. This can allow the DCFC to accommodate current and future EVs with different power requirements, and can reduce or eliminate future costs in otherwise having to replace existing chargers with new chargers designed to better accommodate evolving EV charging requirements and capacities.

For example, in some cases, a DCFC herein can have two power sections or modules for providing power to different EVs. One power section or module can be designed to support a lower power level or output than the other power section or module in the DCFC. This can greatly reduce the overall cost of the DCFC. The other power section or module can be designed to support a higher power level or output to allow the power section or module to deliver higher power levels as needed. The lower power section or module can be configured to donate unused power to the higher power section or module as needed, to allow the higher power section or module to deliver even higher power levels to EVs with higher power requirements or capabilities. This way, the DCFC can deliver asymmetrical power levels to EVs and dynamically adapt power outputs to accommodate different EV charging requirements or needs, while minimizing cost increases.

In addition, the DCFC herein can have a single or standalone design, which can simplify the deployment and installation of the DCFC, and further reduce costs. For example, instead of having a distributed architecture, the DCFC can be a fully self-contained unit with multiple power sections or modules and charging cables or connectors for delivering power to multiple EVs. Such a design reduces the amount of high-power cable runs across deployment locations, which can increase installation cost and complexity. Moreover, by having the various the components of the DCFC contained within a single unit, the DCFC can eliminate the need to deploy, install, and interconnect separate components, thus increasing ease of installation and deployment. Unlike some current DCFCs, instead of having to deploy or install separate components to service different EVs, the DCFC herein can service multiple EVs from a single, standalone unit.

Figure 1:
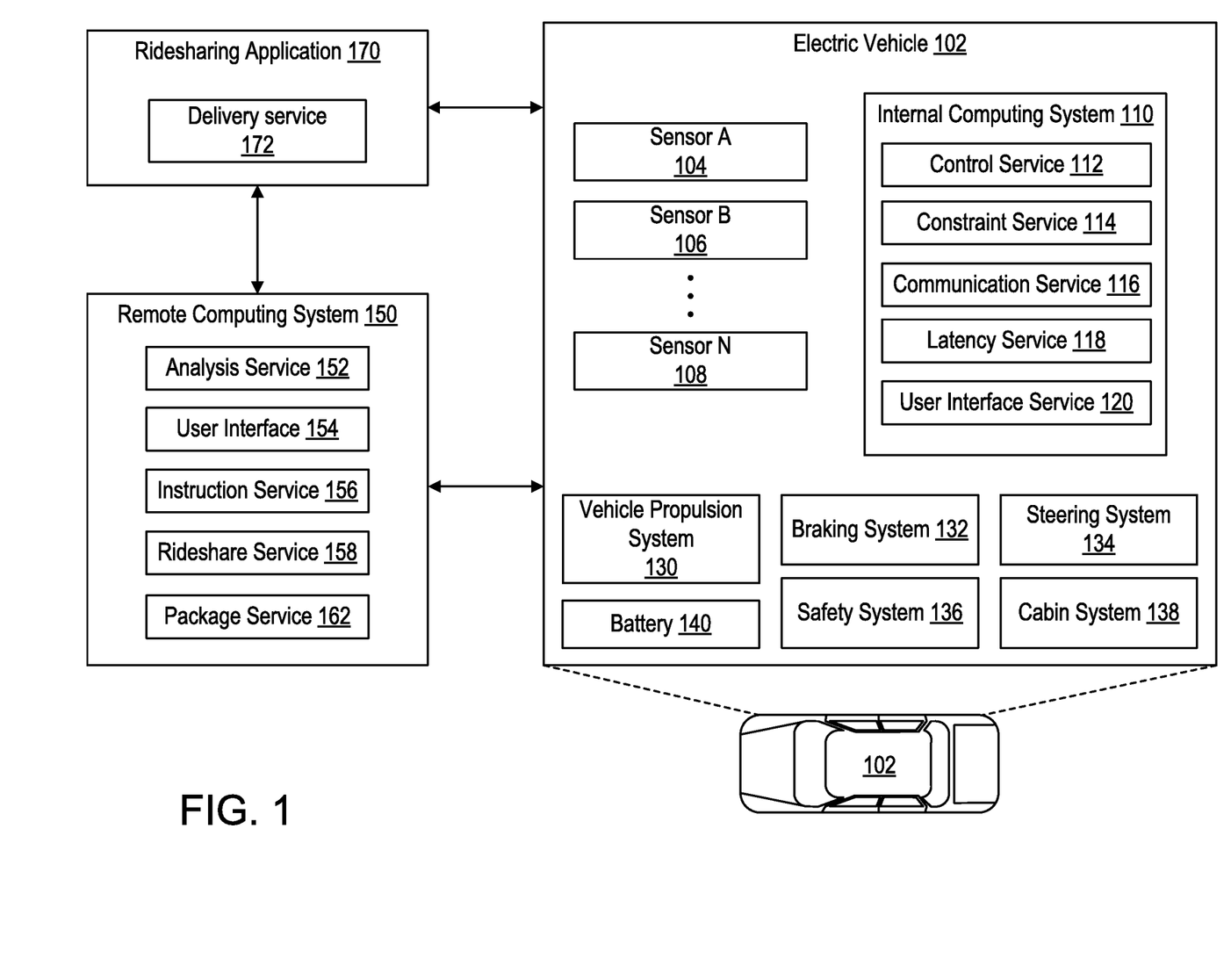
FIG. 1 illustrates an example autonomous vehicle environment including a computing system in communication with an autonomous electric vehicle, in accordance with some examples.

FIG. 1 illustrates an example autonomous vehicle environment 100. The example autonomous vehicle environment 100 includes an electric vehicle (EV) 102 capable of autonomous driving, a remote computing system 150, and a ridesharing application 170. The electric vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The electric vehicle 102 can be charged using a DCFC as described herein. Moreover, the electric vehicle 102 can navigate about roadways without a human driver based on sensor signals generated by sensors 104-108 on the electric vehicle 102. The sensors 104-108 on the electric vehicle 102 can include one or more types of sensors and can be arranged about the electric vehicle 102. For example, the sensors 104-108 can include, without limitation, one or more inertial measuring units (IMUs), one or more image sensors (e.g., visible light image sensors, infrared image sensors, video camera sensors, etc.), one or more light emitting sensors (e.g., one or more lasers, one or more light detection and ranging sensors (LIDARs), etc.), one or more global positioning system (GPS) devices, one or more radars, one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., an infrared camera). Other implementations can include any other number and type of sensors.

The electric vehicle 102 can include several mechanical systems that are used to effectuate motion of the electric vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the electric vehicle 102. The steering system 134 can include suitable componentry configured to control the direction of movement of the electric vehicle 102 during navigation.

The electric vehicle 102 can include a battery 140 or battery pack that can store electricity and power the electric vehicle 102. The battery 140 can provide electricity to the vehicle propulsion system 130, which can convert the electricity into mechanical energy for propulsion. The battery 140 can also provide electricity to other components of the electric vehicle 102 to power such components.

The electric vehicle 102 can also include a safety system 136. The safety system 136 can include lights and signal indicators, a parking brake, airbags, etc. The electric vehicle 102 can also include a cabin system 138, which can include cabin temperature control systems, in-cabin entertainment systems, etc.

The electric vehicle 102 can include an internal computing system 110 in communication with the sensors 104-108, the systems 130, 132, 134, 136, and 138, and/or the battery 140. The internal computing system 110 includes one or more processors and at least one memory for storing instructions executable by the one or more processors. The computer-executable instructions can make up one or more services for controlling the electric vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the electric vehicle 102. In some examples, control service 112 may carry out operations in concert with one or more other systems of electric vehicle 102.

The internal computing system 110 can also include a constraint service 114 to facilitate safe propulsion of the electric vehicle 102. The constraint service 116 includes instructions for activating a constraint based on a rule-based restriction upon operation of the electric vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), $3^{rd}$ Generation (3G), $5^{th}$ Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of electric vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the electric vehicle 102 regarding destinations, requested routes, or other requested operations.

As described above, the remote computing system 150 can be configured to send and receive signals to and from the electric vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from electric vehicle 102 and analyze the data to train or evaluate machine learning algorithms for operating the electric vehicle 102. The analysis service 152 can also perform analysis pertaining to data associated with one or more errors or constraints reported by electric vehicle 102.

The remote computing system 150 can also include a user interface service 154 configured to present metrics, video, images, sounds reported from the electric vehicle 102 to an operator of remote computing system 150, maps, routes, navigation data, notifications, user data, vehicle data, software data, and/or any other content. User interface service 154 can receive, from an operator, input instructions for the electric vehicle 102.

The remote computing system 150 can also include an instruction service 156 for sending instructions regarding the operation of the electric vehicle 102. For example, in response to an output of the analysis service 152 or user interface service 154, instructions service 156 can prepare instructions to one or more services of the electric vehicle 102 or a co-pilot or passenger of the electric vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch electric vehicle 102 for a requested trip.

The rideshare service 158 can also act as an intermediary between the ridesharing app 170 and the electric vehicle 102. For example, rideshare service 158 can receive from a passenger instructions for the electric vehicle 102, such as instructions to go around an obstacle, change routes, honk the horn, etc. The rideshare service 158 can provide such instructions to the electric vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the electric vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the electric vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing electric vehicle 102 for both ridesharing and package delivery is increased utilization of the electric vehicle 102. Instruction service 156 can continuously keep the electric vehicle 102 engaged in a productive itinerary between rideshare trips by filling what otherwise would have been idle time with productive package delivery trips.

Figure 2:
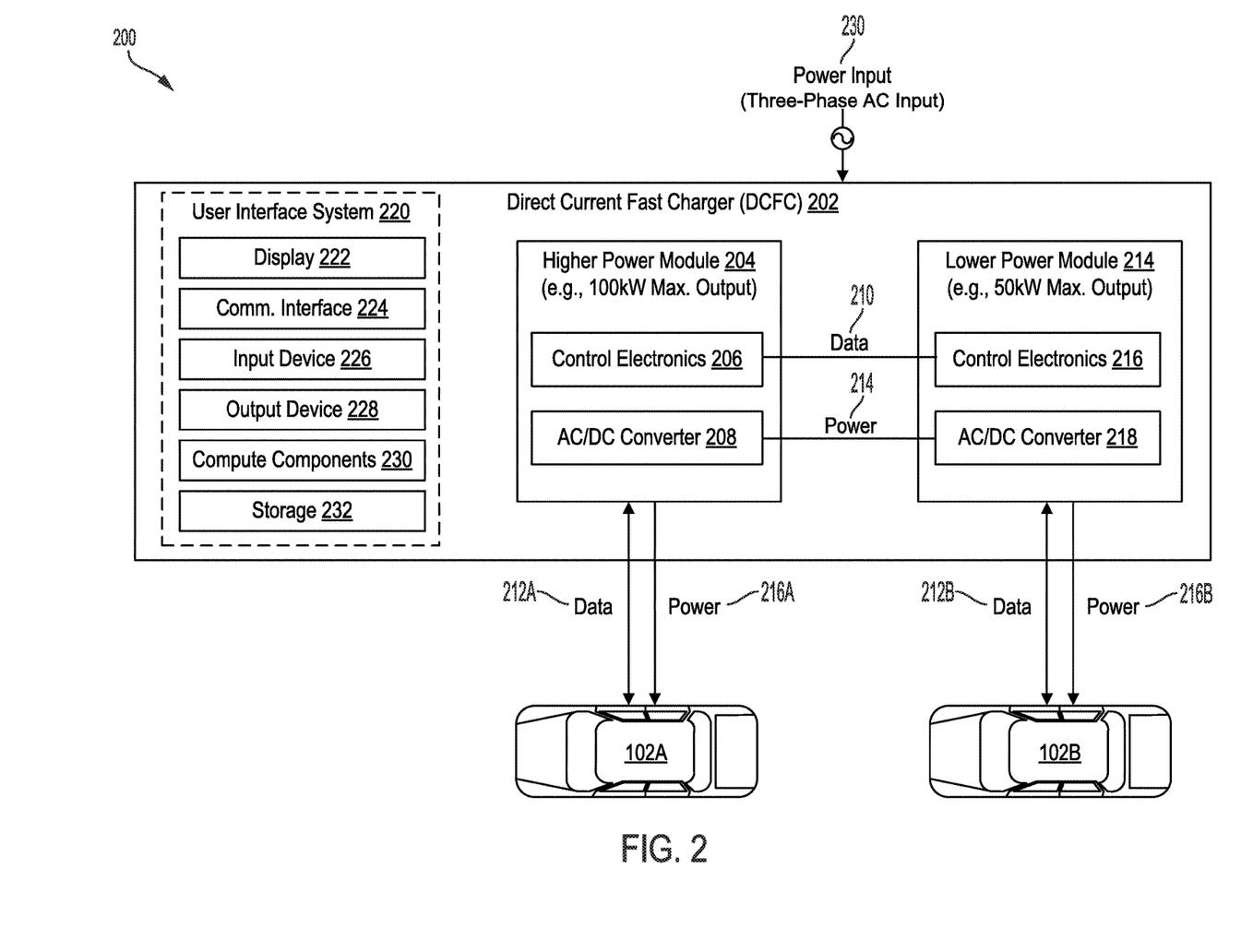
FIG. 2 illustrates an example architecture of a Direct Current Fast Charger configured to provide asymmetrical power to multiple charging vehicles, in accordance with some examples.

FIG. 2 illustrates an example architecture 200 for a DCFC 202 configured to provide asymmetrical power to multiple charging vehicles. The DCFC 202 can receive a power input 230 (e.g., a three-phase AC power input) from a power source (e.g., the grid) and use the power input 230 to charge multiple EVs. The DCFC 202 can output different power levels to different EVs to allow the different EVs to charge at different charging rates. In the example architecture 200, the DCFC 202 includes a higher power module 204 and a lower power module 214. The DCFC 202 can be a stand-alone unit containing the higher power module 204 and lower power module 214. Housing the higher power module 204 and the lower power module 214 within a single, self-contained charger unit can provide cost savings and reduce charger and installation complexity.

The higher power module 204 can be designed to support higher power levels and charging rates than the lower power module 214. For example, the lower power module 214 can be capped at a specific, lower power level and charging rate than the higher power module 204, thereby lowering the overall cost of the DCFC 202. However, the lower power module 214 can be designed to donate power to the higher power module 204 as needed (e.g., to charge an EV requesting a higher charge rate than a maximum charge rate of the higher power module 204) to increase the maximum power output of the higher power module 204 in order to further increase the charging rate provided by the higher power module 204.

For example, assume the DCFC 202 is designed for a total power output of 150 kW, with the higher power module 204 having a maximum power output of 100 kW and the lower power module 214 being capped at a maximum power output of 50 kW. In this example, if an EV using the higher power module 204 requests a 150 kW charge rate, which exceeds the maximum power output of the higher power module 204, and the lower power module 214 is unused and has 50 kW of output capacity available, the lower power module 214 can donate its available 50 kW of power output to the higher power module 204 to increase the maximum power output of the higher power module 204 to 150 kW. The higher power module 204 can then use the donated power from the lower power module 214 as well as its own power to charge the EV at the requested 150 kW charge rate. This way, the higher power module 204 can increase its maximum power output and the DCFC 202 can flexibly provide higher power outputs to suitable vehicles while not incurring the cost of being equipped with multiple high power outputs.

The higher power module 204 and the lower power module 214 can include control electronics 206 and 216 to manage power module operations and communications. The control electronics 206 and 216 can include hardware and circuitry such as processors, controllers, memory, communication interfaces, etc. The control electronics 206 and 216 can also include software to manage operations of the control electronics 206 and 216 and any other components in the higher power module 204 and lower power module 214. In some examples, the control electronics 206 and 216 can manage communications between the control electronics 206 and 216 as well as communications between the EVs 120A and 120B and the control electronics 206 and 216.

Moreover, the control electronics 206 and 216 can include a data connection 210 with each other to allow the control electronics 206 and 216 to exchange data with each other. The data connection 210 can include, for example and without limitation, a physical link (e.g., Ethernet, data bus, power-line communication link, controller area network (CAN) bus, wire, etc.) and/or a wireless link (e.g., Bluetooth, WIFI, near-field communications, cellular, etc.). In some examples, the control electronics 206 and 216 can use the data connection 210 to exchange power module status/state information, requests and operations for sharing power between the lower power module 214 and the higher power module 204, etc.

The control electronics 206 and 216 can also include data connections 212A and 212B with EVs 102A and 102B. For example, the control electronics 206 can include a data connection 212A with the EV 102A and the control electronics 216 can include a data connection 212B with the EV 102B. The data connections 212A and 212B can include, for example and without limitation, a physical link (e.g., Ethernet, power-line communication link, wire, etc.) and/or a wireless link (e.g., Bluetooth, WIFI, near-field communications, cellular, etc.). The control electronics 206 and 216 can use the data connections 212A and 212B to communicate with the EVs 102A and 102B. For example, the control electronics 206 can use the data connection 212A to send or receive charging information to or from EV 102A, and the control electronics 216 can use the data connection 212B to send or receive charging information to or from EV 102B. The charging information can include, for example and without limitation, charge requests, charge parameters such as requested charge rates, etc.

The higher power module 204 and lower power module 214 can also include rectifiers (AC/DC converters) 208 and 218 to convert AC power from the power input 230 into DC power for charging the EVs 102A and 102B. Once the AC power has been converted to DC power, the rectifiers 208 and 218 can output the DC power to the EVs 102A and 102B for charging. In some examples, the rectifier 208 on the higher power module 204 can support higher power levels than the rectifier 218 on the lower power module 214 and can have a higher maximum power output than the rectifier 218 on the lower power module 214. The rectifier 208 on the higher power module 204 can also increase its power output by receiving power donated from the rectifier 218 on the lower power module 214, as further described herein. In some implementations, the rectifier 218 on the lower power module 214 can similarly increase its power output using power donated from the rectifier 208 on the higher power module 204.

In some implementations, the rectifiers 208 and 218 can share power through a power cable 214 (e.g., power-line communication cable) between the higher power module 204 and the lower power module 214. For example, the control electronics 206 on the higher power module 204 can send a request for additional power to the control electronics 216 on the lower power module 214. The control electronics 206 can send the request for additional power through the data connection 210. The control electronics 216 on the lower power module 214 can check whether the lower power module 214 is inactive and/or has available power to donate. If the lower power module 214 has available power to donate, the control electronics 216 can instruct the rectifier 218 to send power to the rectifier 208 on the higher power module 204 through the power cable 214. The rectifier 208 can then receive (through the power cable 214) the power from the rectifier 218 on the lower power module 214, and use the received power to increase its power output to the EV 102A.

In some cases, the power cable 214 can also support data communications. For example, in some implementations, the data connection 210 can be established through the power cable 214. The higher power module 204 and the lower power module 214 can also include power cables 216A and 216B (e.g., charging cables) for transmitting power to the EVs 102A and 102B, which the EVs 102A and 102B can use to charge their batteries. In some implementations, the power cables 214, 216A, and 216B can also support data communications. For example, in some cases, the higher power module 204 and the lower power module 214 can use the power cables 216A and 216B to establish the data connections 212A and 212B with the EVs 102A and 102B.

In some implementations, the DCFC 202 can include a user interface system 220 for users to interact with the DCFC 202. For example, the user interface system 220 can allow users to start and stop charging operations at the higher power module 204 and the lower power module 214, provide payment for using the DCFC 202 to charge their vehicles, input information (e.g., charging parameters, vehicle information, user information, preferences, etc.) into the DCFC 202, view or monitor charging state or conditions, etc. The user interface system 220 can include a display 222 for presenting information to users, a communication interface 224 (wireless and/or wired) for communicating with one or more devices (e.g., the control electronics 206 and 216, a user device, a remote computing system, etc.), an input device 226 (e.g., a keyboard, a mouse, a touchscreen or touch pad, a card reader, a microphone, etc.), an output device 228 (e.g., a speaker, a screen, etc.), compute components 230 (e.g., a CPU, a GPU, a DSP, etc.), and a storage device 232 for storing data.

In some cases, the user interface system 220 can include more or less components than those shown in FIG. 2, such as memory (e.g., RAM, ROM, etc.), electronic circuits, microcontrollers, etc. Moreover, in some implementations, the user interface system 220 can be part of, or implemented by, the DCFC 202. In other implementations, the user interface system 220 can be separate from the DCFC 202. For example, the user interface system 220 can implemented by a separate computing device or can be a separate, standalone user interface device.

While the DCFC 202, the higher power module 204, and the lower power module 214 are shown to include certain components, one of ordinary skill will appreciate that the DCFC 202, the higher power module 204, and/or the lower power module 214 can include more or fewer components than those shown in FIG. 2. For example, DCFC 202, the higher power module 204 and the lower power module 214 can also include, in some instances, one or more memory devices (e.g., RAM, ROM, cache, and/or the like), one or more storage devices, one or more filters, one or more sensors, one or more DC/DC converters, one or more gate drivers, one or more switches, and/or other electronic or processing devices that are not shown in FIG. 2.

Moreover, while the DCFC 202 is shown in FIG. 2 to include two power modules (204, 214), it should be noted that in other examples, the DCFC 202 can include more than two power modules. For example, the DCFC 202 can include multiple higher power modules and one or more lower power modules, or multiple lower power modules and one or more higher power modules.

Figure 3A:
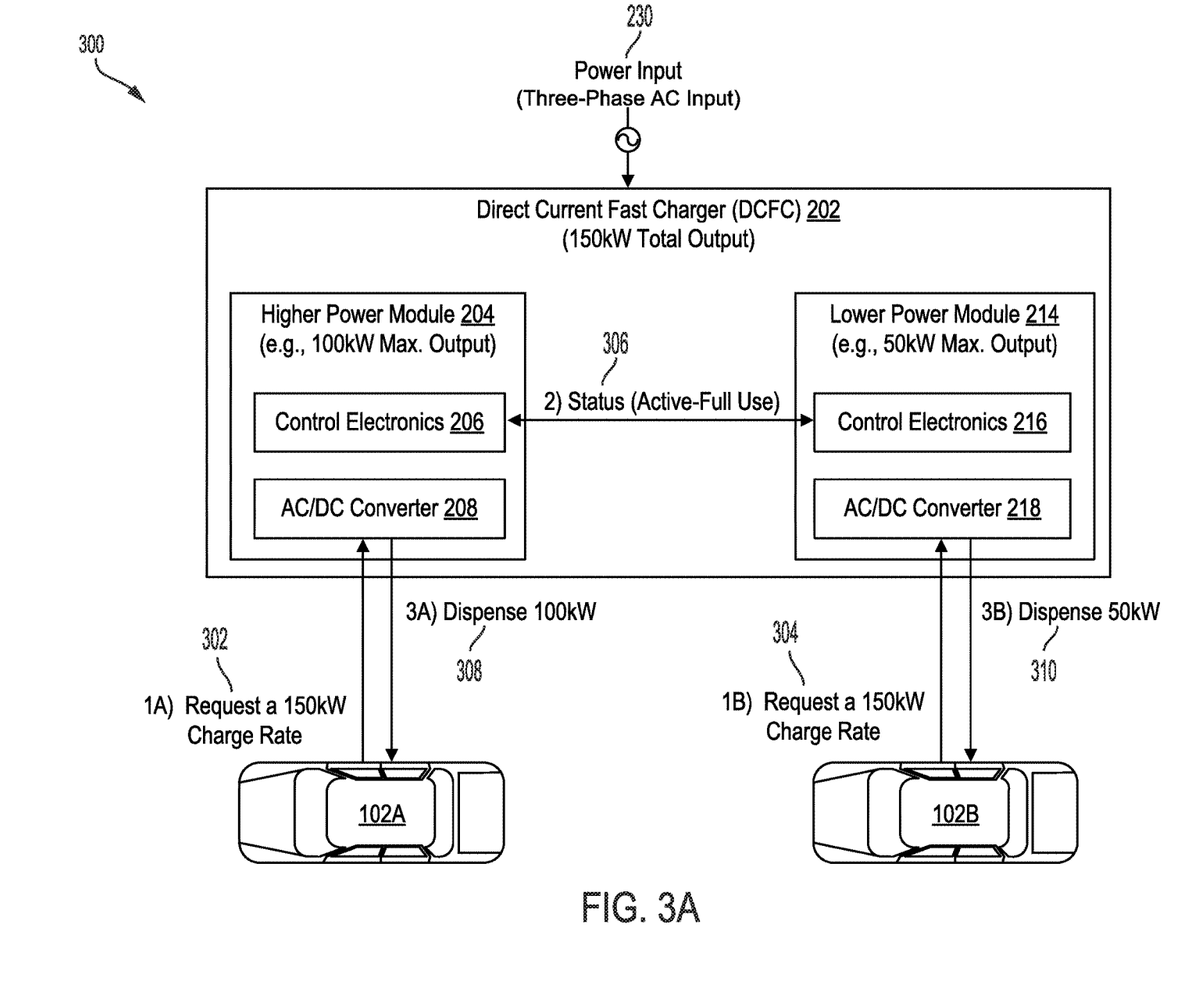
FIGS. 3A and 3B illustrate example use case scenarios where a Direct Current Fast Charger is simultaneously charging two vehicles at different charge rates, in accordance with some examples.
Figure 3B:
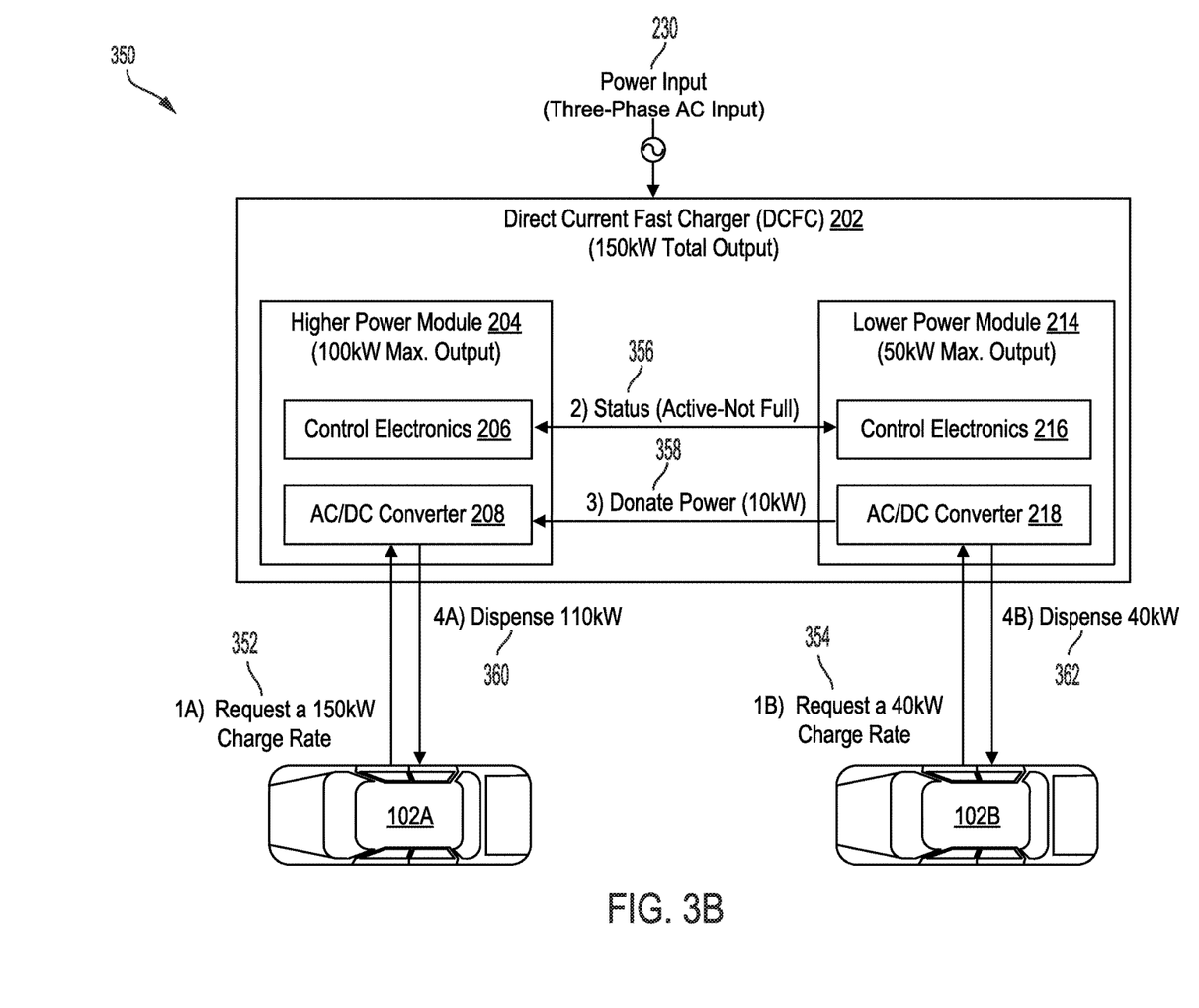

FIGS. 3A and 3B illustrate example use case scenarios 300, 350 where the DCFC 202 is simultaneously charging two vehicles at different (asymmetric) charge rates. In these examples, the DCFC 202 has a total power capacity of 150 kW, the higher power module 204 has a maximum power output of 100 kW, and the lower power module 214 has a power output capped at 50 kW. However, the total power capacity of the DCFC 202 and the maximum power outputs of the higher power module 204 and lower power module 214 in FIGS. 3A and 3B are merely illustrative examples provided for explanation purposes. One of ordinary skill in the art will recognize that, in other examples, the DCFC 202, the higher power module 204, and the lower power module 214 can have different power capacities than those provided in these illustrative examples.

With reference to FIG. 3A, EV 102A is connected to the higher power module 204, EV 102B is connected to the lower power module 214, and the higher power module 204 and lower power module 214 are both being used at their maximum capacities by EVs 102A and 102B. To initiate charging, EV 102A can send (e.g., via data connection 212A) a charge request 302 to the higher power module 204 and EV 102B can send (e.g., via data connection 212B) a charge request 304 to the lower power module 204. In this example, the charge request 302 from EV 102A includes a request to charge at a 150 kW charge rate, which exceeds the maximum output of the higher power module 204, and the charge request 304 from EV 102B includes a request to also charge at a 150 kW charge rate, which similarly exceeds the maximum output of the lower power module 214.

When the control electronics 206 in the higher power module 204 receive the charge request 302 from EV 102A, the control electronics 206 can determine that the charge rate being requested exceeds the maximum power output of the higher power module 204. The control electronics 206 can check if the lower power module 214 is able to donate power to the higher power module 204. Here, the control electronics 206 can request (e.g., via data connection 210) status information 306 from the control electronics 216 in the lower power module 214. The control electronics 216 in the lower power module 214 can communicate (e.g., via data connection 210) the status information 306 to the control electronics 206 in the higher power module 204, which the control electronics 216 can use to determine if the lower power module 214 is currently able to donate power.

The status information 306 can include, for example and without limitation, information indicating whether the lower power module 214 is active or inactive, how much power is being used (if any) by the lower power module 214, any charging parameters (e.g., charge rate, charge time, EV charging capacity, etc.) associated with a charge request (e.g., 304) and/or an active charging operation associated with the lower power module 214, whether the lower power module 214 is currently able to donate power to the higher power module 204, how much power (if any) the lower power module 214 can donate to the higher power module 204, and/or any other status or charging information. The control electronics 206 in the higher power module 204 can use the status information 306 to determine if it can receive donated power from the lower power module 214 to increase its power output, and determine a charge rate it can provide to the EV 102A.

In this example, the status information 306 can indicate that the lower power module 214 is actively being used at full capacity. Therefore, the higher power module 204 can determine that it is currently unable to receive donated power from the lower power module 214. The control electronics 206 in the higher power module 204 can thus instruct the rectifier 208 to output power at the maximum charge rate, even though the maximum charge rate of the higher power module 204 is lower than the charge rate requested by the EV 102A.

The rectifier 208 can then dispense power 308 (e.g., via power cable 216A) to the EV 102A at the maximum charge rate (e.g., 100 kW) of the higher power module 204. For example, the rectifier 208 can receive from the power input 230 a maximum AC power input associated with the higher power module 204 and convert the AC power input into a 100 kW DC power output. Moreover, since the lower power module 214 is unable to donate power to the higher power module 204, the rectifier 218 in the lower power module 214 can proceed to dispense power 310 (e.g., via power cable 216B) to the EV 102B at the maximum charge rate (e.g., 50 kW) of the lower power module 214. For example, the rectifier 218 can receive from the power input 230 a maximum AC power input associated with the lower power module 214 and convert the AC power input into a 50 kW DC power output.

In some cases, the higher power module 204 and the lower power module 214 can periodically exchange status information to determine whether any changes have occurred that may allow the higher power module 204 to start borrowing power from the lower power module 214. For example, the higher power module 204 can periodically request status information from the lower power module 214 to determine if the lower power module 214 can start donating power to the higher power module 204. As another example, the lower power module 214 can report to the higher power module 204 if it is no longer in use and/or if it can start donating power to the higher power module 204. If at any moment the status of the lower power module 214 changes and the lower power module 214 is able to donate power to the higher power module 204, the higher power module 204 can then receive power from the lower power module 214 and use that power to increase the amount of power it dispenses to the EV 102A.

FIG. 3B illustrates an example use case scenario 350 in which the lower power module 214 donates power to the higher power module 204 to allow the higher power module 204 to increase the power dispensed to the EV 102A.

As shown in FIG. 3B, EV 102A is connected to the higher power module 204 and EV 102B is connected to the lower power module 214. To initiate charging, EV 102A can send (e.g., via data connection 212A) a charge request 352 to the higher power module 204 and EV 102B can send (e.g., via data connection 212B) a charge request 354 to the lower power module 204. In this example, the charge request 352 from EV 102A includes a request to charge at a 150 kW charge rate, which exceeds the maximum output of the higher power module 204, and the charge request 354 from EV 102B includes a request to also charge at a 40 kW charge rate, which is 10 kW below the maximum output of the lower power module 214.

When the control electronics 206 in the higher power module 204 receives the charge request 352 from EV 102A, the control electronics 206 can determine that the charge rate being requested exceeds the maximum power output of the higher power module 204. The control electronics 206 can check if the lower power module 214 is able to donate power to the higher power module 204. The control electronics 206 can request (e.g., via data connection 210) status information 356 from the control electronics 216 in the lower power module 214 to determine if the lower power module 214 is able to donate power. The control electronics 216 in the lower power module 214 can communicate (e.g., via data connection 210) the status information 356 to the control electronics 206 in the higher power module 204.

The status information 356 can indicate that the lower power module 214 is currently able to donate power to the higher power module 204. For example, the control electronics 216 in the lower power module 214 can include in the status information 356 an indication that it is currently able to donate 10 kW of power. The control electronics 206 in the higher power module 204 can use the status information 356 to determine that it can receive donated power from the lower power module 214 to increase its power output and determine a charge rate it can provide to the EV 102A based on the power that the lower power module 214 is able to donate. In this example, the higher power module 204 can determine that it is able to receive 10 kW of power from the lower power module 214.

The lower power module 214 can then donate 358 10 kW of power (e.g., via the rectifier 218 and power cable 214) to the higher power module 204. The control electronics 206 in the higher power module 204 can instruct the rectifier 208 to use the 10 kW of power donated by the lower power module 214 to increase the power output of the rectifier 208 from the 100 kW maximum power output to 110 kw (100 kW+the 10 kW donated by the lower power module 214). The rectifier 208 can then dispense power 360 (e.g., via power cable 216A) to the EV 102A at the increased power levels (e.g., 110 kW) produced using the power donated from the lower power module 214. For example, the rectifier 208 can receive from the power input 230 a maximum AC power input associated with the higher power module 204, convert the AC power input into the maximum 100 kW DC power output of the higher power module 204, and increase the maximum 100 kW DC power output to 110 kW based on the 10 kW donated from the lower power module 214.

Moreover, since the charge rate requested by the EV 102B from the lower power module 214 is less than the maximum power output of the lower power module 214, the rectifier 218 in the lower power module 214 can proceed to dispense 362 (e.g., via power cable 216B) to the EV 102B the full amount of power requested (40 kW). For example, the rectifier 218 can receive from the power input 230 a maximum AC power input associated with the lower power module 214 and convert the AC power input into a 50 kW DC power output. The rectifier 218 can share 10 kW of the 50 kW with the higher power module 204 and dispense the rest to the EV 102B.

As previously mentioned, in some cases, the higher power module 204 and the lower power module 214 can periodically exchange status information to determine whether any changes have occurred that may allow the higher power module 204 to borrow more power from the lower power module 214 or may require the lower power module 214 to stop donating power to the higher power module 204. If at any moment the status of the lower power module 214 changes and the lower power module 214 is able to donate more power to the higher power module 204 or is no longer able to donate power to the higher power module 204, the higher power module 204 can change the amount of power it dispenses to the EV 102A accordingly.

Figure 4A:
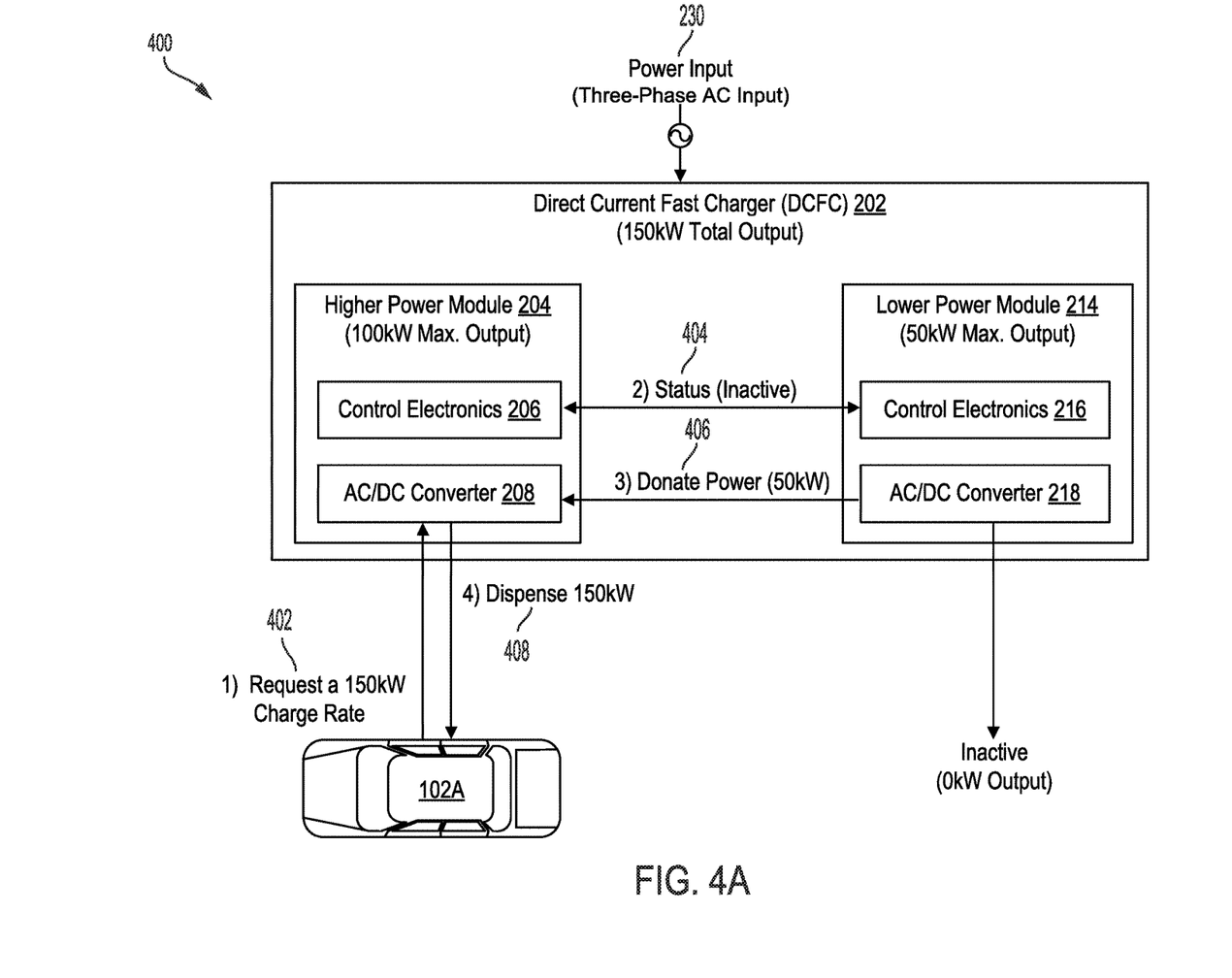
FIG. 4A illustrates an example charger use case scenario for donating power from a lower power module on a Direct Current Fast Charger to a higher power module on the Direct Current Fast Charger, in accordance with some examples.

FIG. 4A illustrates an example charger use case scenario 400 for donating power from the lower power module 214 on the DCFC 202 to the higher power module 204 on the DCFC 202. In this example, the DCFC 202 has a total power capacity of 150 kW, the higher power module 204 has a maximum power output of 100 kW, and the lower power module 214 has a power output capped at 50 kW. However, the total power capacity of the DCFC 202 and the maximum power outputs of the higher power module 204 and lower power module 214 in FIG. 4A are merely illustrative examples provided for explanation purposes. One of ordinary skill in the art will recognize that, in other examples, the DCFC 202, the higher power module 204, and the lower power module 214 can have different power capacities than those provided in this illustrative example.

In the example use case scenario 400, the lower power module 214 is inactive, as no vehicle is currently using the lower power module 214 to charge. Accordingly, the lower power module 214 has available power that it can donate to the higher power module 204 as needed or requested.

Here, the higher power module 204 first receives a charge request 402 from the EV 102A. The charge request 402 in this example includes a request for a 150 kW charge rate. When the higher power module 204 receives the charge request 402, the control electronics 206 can determine that the requested charge rate (e.g., 150 kW) exceeds the maximum power output (e.g., 100 kW) of the higher power module 204. The control electronics 206 can then exchange status information 404 with the control electronics 216 in the lower power module 214, to determine whether the lower power module 214 is able to donate power to the higher power module 204 to allow the higher power module 204 to increase its power output.

The status information 404 in this example can indicate that the lower power module 214 is inactive and able to donate up to its full power capacity (e.g., 50 kW) to the higher power module 204. In some examples, when exchanging status information with the control electronics 216 in the lower power module 214, the control electronics 206 in the higher power module 204 can not only request status information from the control electronics 216 in the lower power module 214 but may also request power or notify the control electronics 216 in the lower power module 214 that the higher power module 204 needs additional power. In requesting power or notifying the control electronics 216 in the lower power module 214 that the higher power module 204 needs power, the control electronics 206 in the higher power module 204 can also indicate the amount of power requested/needed as well as any other information such as, for example, an estimated amount of time the higher power module 204 will need the additional power from the lower power module 214.

The rectifier 218 can then donate power 406 to the higher power module 204. Since the lower power module 214 is inactive, the lower power module 214 can donate its full 50 kW power capacity to the higher power module 204. In some examples, the rectifier 218 can receive from the power input 230 a maximum AC power input configured for the lower power module 214 and convert the maximum AC power input into DC power that it can donate to the higher power module 204. The rectifier 218 can thus convert the AC power input into DC power, and donate the DC power to the higher power module 204.

The rectifier 208 in the higher power module 204 can then dispense 408 150 kW of power to the EV 102A, as requested in the charge request 402. The 150 kW of power dispensed by the rectifier 208 can include the maximum 100 kW power output of the higher power module 204 plus the 50 kW of power donated by the lower power module 214. This way, the higher power module 204 can meet the requested charge rate even though it exceeds the maximum power output of the higher power module 204. This technology allows the higher power module 204 to exceed its maximum power output while reducing the overall cost of the DCFC 202 by leveraging borrowed power from the lower power module 214 rather than including costlier components in the higher power module 204 to allow the higher power module 204 to otherwise provide the same, increased power levels entirely on its own.

Figure 4B:
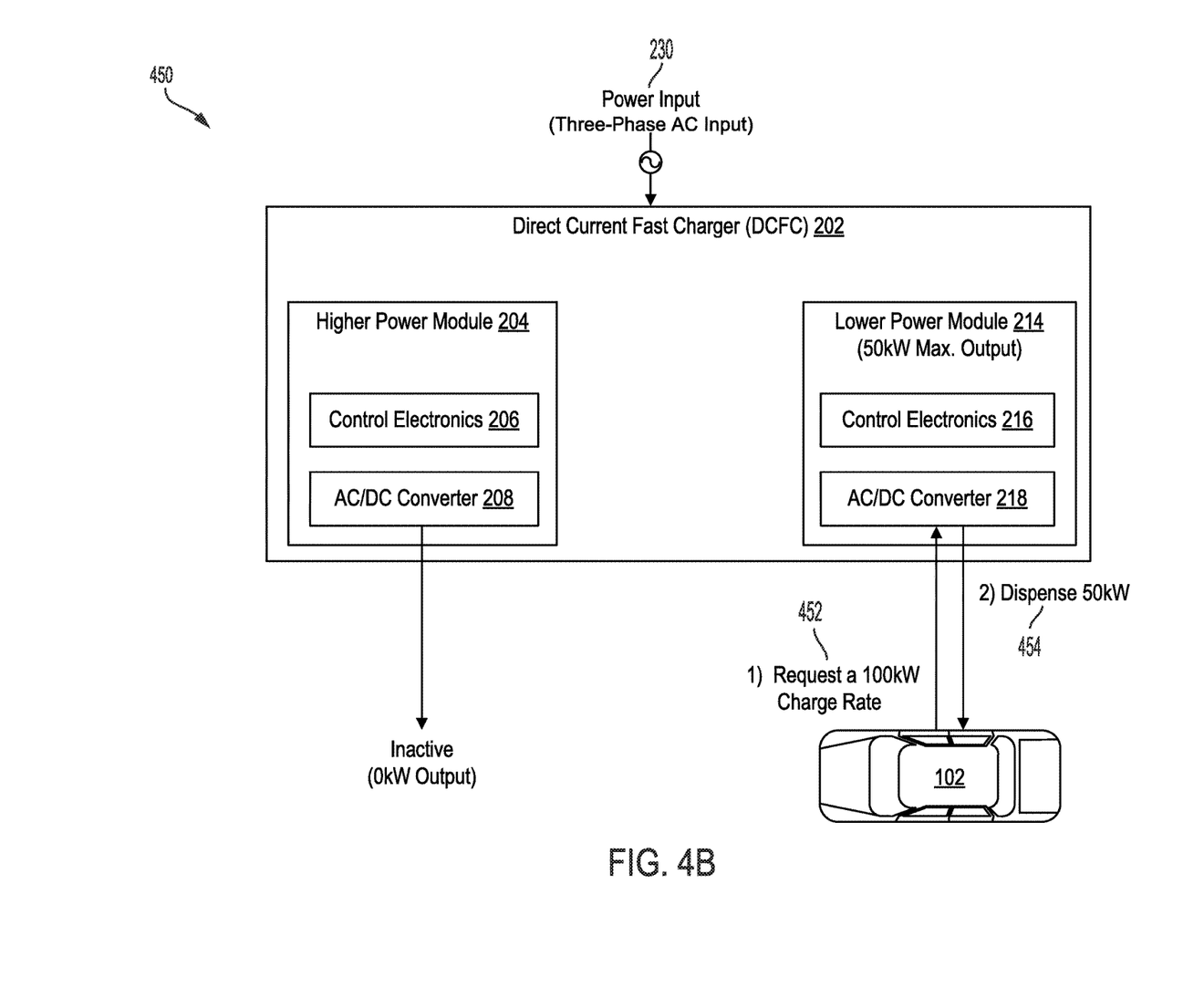
FIG. 4B illustrates another example charger use case scenario where a lower power module on a Direct Current Fast Charger is active and a higher power module on a Direct Current Fast Charger is inactive, in accordance with some examples.

FIG. 4B illustrates another example charger use case scenario 450 where the lower power module 214 is active and the higher power module 204 is inactive. In this example, to reduce the cost of the DCFC 202, the installation cost of the DCFC 202, and the overall complexity of the DCFC 202, the lower power module 214 is capped at a reduced 50 kW power output, and the higher power module 204 and/or the lower power module 214 are not equipped with the capabilities for sharing power from the higher power module 204 to the lower power module 214. Thus, despite the higher power module 204 being inactive, the higher power module 204 in this example would be unable to donate power to the lower power module 214.

As shown in FIG. 4B, the lower power module 214 first receives a charge request 452 from EV 102. The charge request 452 in this example includes a request for a 100 kW charge rate. Since the lower power module 214 is capped at the 50 kW power levels, the lower power module 214 is unable to provide the full requested 100 kW charge rate. Instead, the lower power module 214 can provide its full 50 kW charge rate to the EV 102. Here, the rectifier 218 can receive its maximum AC power input from the power input 230 and convert the AC power input to its maximum 50 kW DC power output. The rectifier 218 can then dispense 454 the 50 kW DC power output to the EV 102 for charging.

Figure 5:
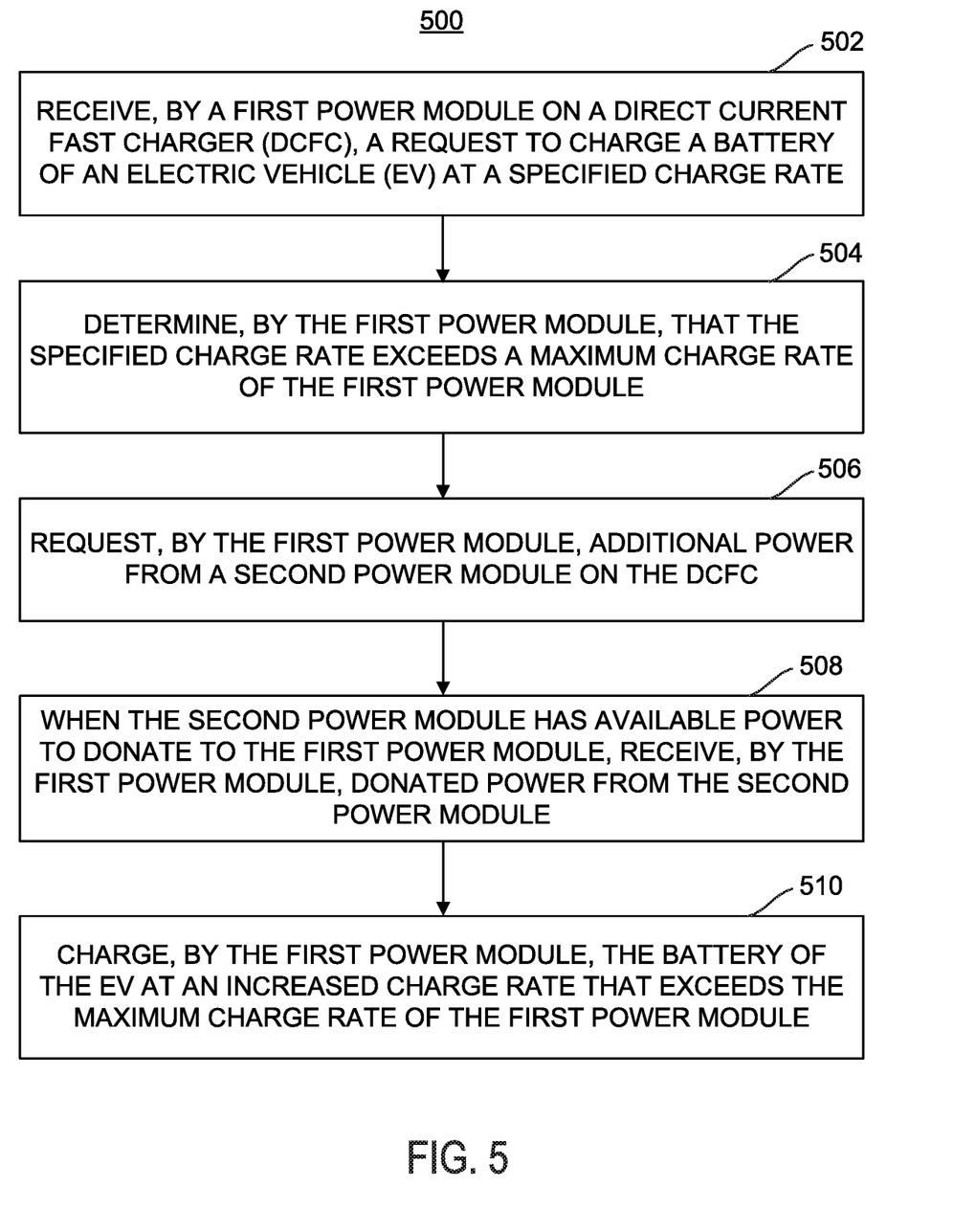
FIG. 5 illustrates an example method for providing asymmetrical charging power to multiple electric vehicles, in accordance with some examples.

Having disclosed some example system components and concepts, the disclosure now turns to FIG. 5, which illustrates an example method 500 for providing asymmetrical charging power to multiple EVs. The steps outlined herein are exemplary and can be implemented in any combination thereof, including combinations that exclude, add, or modify certain steps.

At step 502, a first power module (e.g., 204) on a DCFC (e.g., 202) can receive a request to charge a battery of an EV (e.g., 102) at a specified charge rate. For example, the first power module can receive a request to charge the battery of the EV at a 150 kW charge rate. The EV can be connected to the first power module via a power cable that allows the EV to receive power from the first power module for charging the battery of the EV. The EV can also establish a data connection with the first power module via the power cable or a separate network link, such as a wireless link (e.g., Bluetooth, WIFI, near-field communications, cellular, etc.) or a wired link (e.g., Ethernet, a controller area network bus or interface, etc.).

At step 504, the first power module can determine that the specified charge rate exceeds a maximum charge rate of the first power module. For example, if the specified charge rate is 150 kW and the maximum charge rate of the first power module is 100 kW, the first power module can determine that the specified charge rate in the charge request exceeds the first power module's maximum charge rate.

At step 506, the first power module can request additional power from a second power module (e.g., 214) on the DCFC. For example, the first power module can notify the second power module that the first power module needs additional power and/or request status information from the second power module to determine whether the first power module can obtain additional power from the second power module.

At step 508, when the second power module has available power to donate to the first power module, the first power module can receive donated power from the second power module. For example, the second power module can donate to the first power module any available power at the second power module. In some examples, the power level of the second power module can be capped at a reduced maximum power output that is lower than the maximum power output of the first power module.

Moreover, in some examples, the first power module and/or the second power module can determine that the second power module has available power to donate to the first power module based on an operating status (e.g., active, inactive, etc.) of the second power module and/or a power usage (e.g., an amount of power in use, an amount of power not being used, etc.) at the second power module. In some cases, the second power module can be triggered or instructed to donate power to the first power module when it is determined that the second power module has available power to donate.

At step 510, the first power module can charge the battery of the EV at an increased charge rate that exceeds the maximum charge rate of the first power module. The increased charge rate can include a maximum power output of the first power module plus the donated power from the second power module.

In some aspects, the first power module can receive, from a power source (e.g., a grid), a maximum AC power input (e.g., three-phase AC power) associated with the first power module. The maximum AC power input can be the maximum amount of AC power that the first power module is configured to receive, accept, or support. The first power module can then convert, using a rectifier (e.g., 208), the maximum AC power input into DC power. The DC power converted can be up to the maximum power output of the first power module. The first power module can then provide to the EV the DC power as part of the increased charge rate.

In some aspects, the method 500 can include receiving, by the second power module from the power source, a maximum AC power input (e.g., three-phase AC power) associated with the second power module. The maximum AC power input can be the maximum amount of AC power that the second power module is configured to receive, accept, or support. The method 500 can also include converting, by a second rectifier (e.g., 218) on the second power module, the maximum AC power input into DC power and providing, by the second power module to the first power module, the donated power based on the DC power converted by the second rectifier. The DC power converted by the second rectifier can include up to a maximum power output of the second power module.

In some examples, the method 500 can include receiving, by the first power module, a second request to charge a second battery of a second EV at a second specified charge rate, and receiving, by the second power module, a third request to charge a third battery of a third EV at a third specified charge rate. If the second specified charge rate is within the maximum charge rate of the first power module, the first power module can charge the second battery of the second EV at the second specified charge rate. Otherwise, the first power module can try to obtain additional power from the second power module as further explained herein.

The method 500 can further include, while the first power module charges the second battery of the second EV, charging, by the second power module, the third battery of the third EV at a different charge rate than the second specified charge rate in the second request to the first power module. Thus, the first power module and the second power module can charge different vehicles at different charge rates. Moreover, in some examples, the different charge rate can be the lower of the third specified charge rate and a reduced maximum charge rate of the second power module. In other words, if the third specified charge rate exceeds the reduced (e.g., capped) maximum charge rate of the second power module, the second power module can instead provide the reduced maximum charge rate to the third EV. Otherwise, the second power module can provide the third specified charge rate to the third EV.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 6:
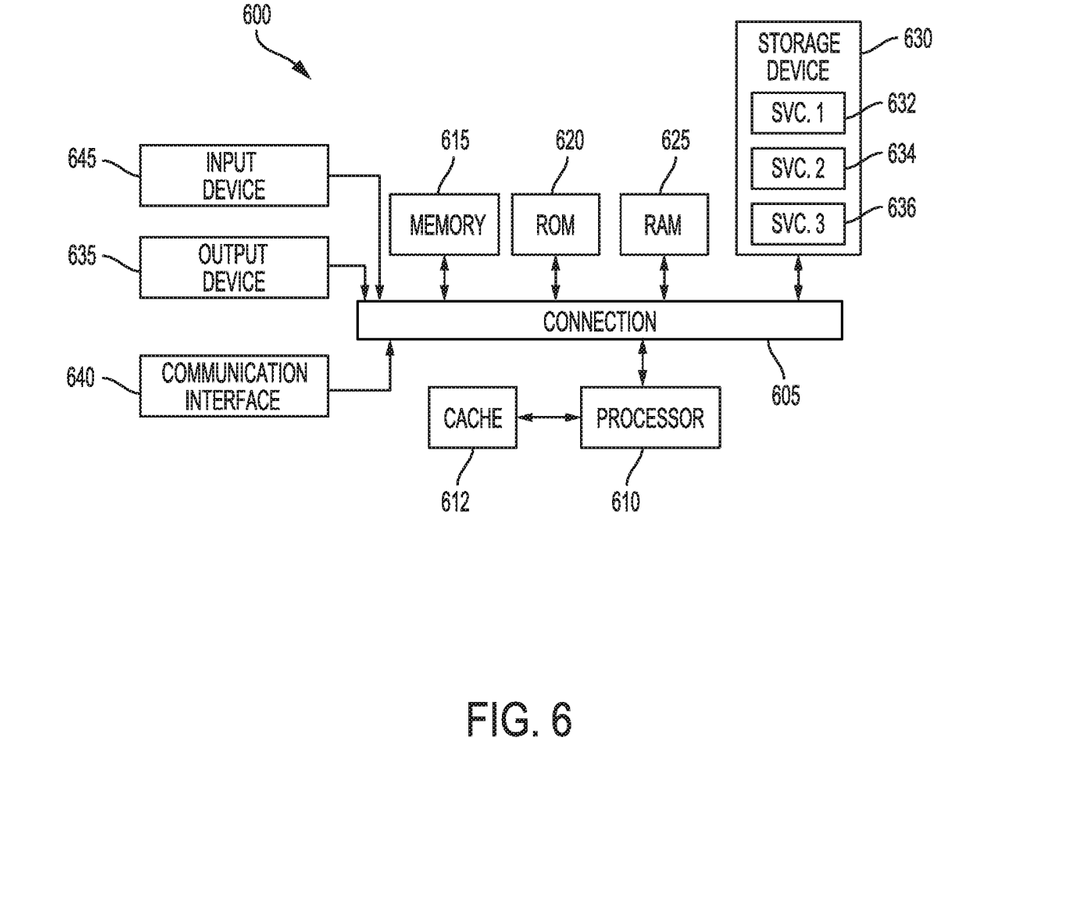
FIG. 6 illustrates an example computing system architecture for implementing various aspects of the present technology, in accordance with some examples.

FIG. 6 illustrates an example computing system 600 which can be, for example, any computing device making up internal computing system 110, remote computing system 150, a passenger device executing rideshare application 170, control electronics 206 and/or 216, user interface system 220, or any other computing device. In FIG. 6, the components of the computing system 600 are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, by a first power module on a direct current fast charger (DCFC), a request to charge a battery of an electric vehicle (EV) at a specified charge rate;
   determining, by the first power module, that the specified charge rate exceeds a maximum charge rate of the first power module;
   requesting, by the first power module, additional power from a second power module on the DCFC;
   when the second power module has available power to donate to the first power module, receiving, by the first power module, donated power from the second power module; and
   charging, by the first power module, the battery of the EV at an increased charge rate that exceeds the maximum charge rate of the first power module, the increased charge rate comprising a maximum power output of the first power module increased by the donated power from the second power module,
   wherein a power level of the second power module is capped at a reduced maximum power output, wherein the maximum power output of the first power module is higher than the reduced maximum power output of the second power module.

2. The method of claim 1, further comprising:
   receiving, by the first power module from a power source, a maximum alternating current (AC) power input associated with the first power module;
   converting, by a rectifier on the first power module, the maximum AC power input into DC power, the DC power comprising the maximum power output; and
   providing, by the first power module to the EV, the DC power as part of the increased charge rate.

3. The method of claim 2, further comprising:
   receiving, by the second power module from the power source, a second maximum alternating current (AC) power input associated with the second power module;
   converting, by a second rectifier on the second power module, the second maximum AC power input into additional DC power; and
   providing, by the second power module to the first power module, the donated power based on the additional DC power converted by the second rectifier.

4. The method of claim 3, wherein the additional DC power comprises a respective maximum power output of the second power module, and wherein the maximum AC power input and the second maximum power input comprise three-phase AC power.

5. The method of claim 1, wherein the DCFC comprises a standalone charging unit containing the first power module and the second power module.

6. The method of claim 1, further comprising:
   determining that the second power module has available power to donate to the first power module based on at least one of an operating status of the second power module and a power usage at the second power module.

7. The method of claim 1, further comprising:
   receiving, by the first power module, a second request to charge a second battery of a second EV at a second specified charge rate, wherein the second specified charge rate is within the maximum charge rate of the first power module;
   receiving, by the second power module, a third request to charge a third battery of a third EV at a third specified charge rate;
   charging, by the first power module, the second battery of the second EV at the second specified charge rate; and
   while the first power module charges the second battery of the second EV, charging, by the second power module, the third battery of the third EV at a different charge rate than the second specified charge rate, the different charge rate comprising a lower one of the third specified charge rate and a reduced maximum charge rate of the second power module.

8. A direct current fast charger (DCFC) comprising:
   a first power module comprising a first rectifier and first control electronics;
   a second power module comprising a second rectifier and second control electronics, the second power module being configured to:
      receive a request to charge a battery of an electric vehicle (EV) at a specified charge rate;
      determine that the specified charge rate exceeds a maximum charge rate of the second power module;
      request additional power from the first power module on the DCFC;

when the first power module has available power to donate to the second power module, receive donated power from the first power module; and charge the battery of the EV at an increased charge rate that exceeds the maximum charge rate of the second power module, the increased charge rate comprising a maximum power output of the second power module increased by the donated power from the first power module, wherein a power level of the first power module is capped at a reduced maximum power output, wherein the maximum power output of the second power module is higher than the reduced maximum power output of the first power module.

9. The direct current fast charger of claim 8, wherein the second power module is configured to:

receive, from a power source, a maximum alternating current (AC) power input associated with the second power module;

convert, using the second rectifier on the second power module, the maximum AC power input into DC power, the DC power comprising the maximum power output; and provide, to the EV, the DC power as part of the increased charge rate.

10. The direct current fast charger of claim 9, wherein the first power module is configured to:

receive, from the power source, a second maximum alternating current (AC) power input associated with the first power module;

convert, by the first rectifier on the first power module, the second maximum AC power input into additional DC power; and provide, to the second power module, the donated power based on the additional DC power converted by the first rectifier.

11. The direct current fast charger of claim 10, wherein the additional DC power comprises a respective maximum power output of the first power module, and wherein the maximum AC power input and the second maximum power input comprise three-phase AC power.

12. The direct current fast charger of claim 8, wherein the DCFC comprises a standalone charging unit containing the first power module and the second power module, and wherein the first control electronics and the second control electronics comprise at least one of a processor, a memory, a controller, and circuitry.

13. The direct current fast charger of claim 8, wherein the first power module is configured to:

determine that the first power module has available power to donate to the second power module based on at least one of an operating status of the first power module and a power usage at the first power module.

14. The direct current fast charger of claim 8, wherein: the second power module is configured to:

receive a second request to charge a second battery of a second EV at a second specified charge rate, wherein the second specified charge rate is within the maximum charge rate of the first power module; and charge the second battery of the second EV at the second specified charge rate; and the first power module is configured to:

receive a third request to charge a third battery of a third EV at a third specified charge rate; and while the second power module charges the second battery of the second EV, charge the third battery of the third EV at a different charge rate than the second specified charge rate, the different charge rate comprising a lower one of the third specified charge rate and a reduced maximum charge rate of the first power module.

15. A non-transitory computer-readable storage medium comprising:

computer-executable instructions for causing a direct current fast charger (DCFC) to:

receive, via a first power module on the DCFC, a request to charge a battery of an electric vehicle (EV) at a specified charge rate;

determine, via the first power module, that the specified charge rate exceeds a maximum charge rate of the first power module;

request additional power from a second power module on the DCFC;

when the second power module has available power to donate to the first power module, receive, via the first power module, donated power from the second power module; and charge, via the first power module, the battery of the EV at an increased charge rate that exceeds the maximum charge rate of the first power module, the increased charge rate comprising a maximum power output of the first power module increased by the donated power from the second power module, wherein a power level of the second power module is capped at a reduced maximum power output, and wherein the maximum power output of the first power module is higher than the reduced maximum power output of the second power module.

16. The non-transitory computer-readable storage medium of claim 15, comprising additional computer-executable instructions for causing the DCFC to:

receive, via the first power module from a power source, a maximum alternating current (AC) power input associated with the first power module;

convert, via a rectifier on the first power module, the maximum AC power input into DC power, the DC power comprising the maximum power output; and provide, via the first power module to the EV, the DC power as part of the increased charge rate.

17. The non-transitory computer-readable storage medium of claim 16, comprising additional computer-executable instructions for causing the DCFC to:

receive, via the second power module from the power source, a second maximum alternating current (AC) power input associated with the second power module;

convert, via a second rectifier on the second power module, the second maximum AC power input into additional DC power; and provide, via the second power module to the first power module, the donated power based on the additional DC power converted by the second rectifier.

18. The non-transitory computer-readable storage medium of claim 15, wherein the DCFC comprises a standalone unit.

\* \* \* \* \*